United States Patent [19]
Jung

[11] Patent Number: 5,689,306
[45] Date of Patent: Nov. 18, 1997

[54] METHOD AND APPARATUS FOR ENCODING A VIDEO SIGNAL USING PIXEL-BY-PIXEL MOTION PREDICTION

[75] Inventor: Hae-Mook Jung, Seoul, Rep. of Korea

[73] Assignee: Daewoo Electronics Co., Ltd., Seoul, Rep. of Korea

[21] Appl. No.: 393,296

[22] Filed: Feb. 23, 1995

[51] Int. Cl.⁶ .................................................. H04N 7/32
[52] U.S. Cl. ..................................... 348/416; 348/699
[58] Field of Search ................................ 348/384, 390, 348/400–403, 405, 407, 409–413, 415, 416, 420, 699; 382/232, 236, 238, 241–243; H04N 7/137

[56] References Cited

U.S. PATENT DOCUMENTS

| | | | |
|---|---|---|---|
| 5,317,397 | 5/1994 | Odaka et al. | 348/416 |
| 5,453,801 | 9/1995 | Kim | 348/699 |
| 5,500,689 | 3/1996 | Lam | 348/699 |
| 5,561,475 | 10/1996 | Jung | 348/699 |
| 5,596,370 | 1/1997 | Jung | 348/416 |
| 5,598,216 | 1/1997 | Lee | 348/416 |

FOREIGN PATENT DOCUMENTS

WO-A-91 11782  8/1991  WIPO.

OTHER PUBLICATIONS

Michael Hötter et al., "Image Segmentation Based on Object Oriented Mapping Parameter Estimation", Signal Processing European Journal Devoted to the Methods and Applications of Signal Processing, vol. 15, pp. 315–334, Oct. 1988.

Gary J. Sullivan et al., "Motion Compensation for Video Compression Using Control Grid Interpolation", ICASSP '91–International Conference on Acoustics, Speech and Signal Processing, vol. 4, pp. 2713–2716, Apr. 1991.

Franz May et al., "Picture Coding with Motion Analysis for Low Rate Transmission", ICC'82–IEEE International Conference on Communications, vol. 1, pp. 2G.7.1–2G.7.5, Jun. 1982.

C.L. Huang et al., "A New Motion Compensation Method for Image Sequence Coding Using Hierarchical Grid Interpolation", IEEE Transactions on Circuits and Systems for Video Technology, vol. 4, pp. 42–51, Feb. 1994.

Y. Nakaya et al., "An Iterative Motion Estimation Method Using Triangular Patches for Motion Compensation", SPIE Visual Commnication and Image Processing '91, vol. 1605, pp. 546–557, Nov. 1991.

(List continued on next page.)

*Primary Examiner*—Richard Lee
*Attorney, Agent, or Firm*—Anderson Kill & Olick, P.C.

[57] ABSTRACT

An apparatus for determining a preducted current frame based on a current frame and a previous frames comprises: a unit for selecting a number of pixels from the pixels contained in the previous frame to detect a first set of motion vectors; a unit for producing a second set of motion vectors for all of the pixels contained in the current frame by using first set of motion vectors; a unit for assigning the value of each of the pixels in the previous frame as the value of one of the pixels in the current frame by using the second set of motion vectors, to determine a preliminary preducted current frame; a unit for finding the difference between the current frame and the preliminary preducted current frame to detect collective error regions; a unit for selecting one pixel amount the pixels contained in each of the collective error regions; a unit for detecting a third set of motion vectors for the selected pixels from the collective error regions; a unit for producing a fourth set of motion vectors for all of the pixels contained in the current frame by using the first set of motion vectors and the third set of motion vectors; and a unit for assigning the value of each of the pixels in the previous frame through one of the fourth set of motion vectors, as the value of one of the pixels in the current frame.

6 Claims, 9 Drawing Sheets

OTHER PUBLICATIONS

IEEE Transactions on Commuications, vol. Com–30, No. 1, Jan. 1982 pp. 201–211, Yuichi Ninomiya ad Yoshimichi Ohtsuka "Motion–Com . . . ".

IEEE Transactions on Communications, vol. Com–33, No. 12, Dec. 1985 pp. 1291–1302, Staffan Ericsson "Fixed and Adaptive Predictors . . . ".

IEEE Transaction on Communications, vol. Com–32, No. 3, Mar. 1984 pp. 225–232, Wen–Hsiung Chen, et al. "Scene Adaptive Coder".

FEATURE POINT

FIG.7B

FEATURE POINT

FIG.8

QUASI-FEATURE POINT

| 3 | 2 | 2 | 2 | 2 | 2 |
|---|---|---|---|---|---|
| 1 | 2 | 2 | 2 | 2 | 0 |
| 0 | 0 | 0 | 0 | 0 | 0 |

FIG.10B

METHOD AND APPARATUS FOR ENCODING A VIDEO SIGNAL USING PIXEL-BY-PIXEL MOTION PREDICTION

FIELD OF THE INVENTION

The present invention relates to a method and an apparatus for encoding a video signal; and, more particularly, to a method and an apparatus for encoding a video signal using a pixel-by-pixel motion prediction technique.

DESCRIPTION OF THE PRIOR ART

As is well known, transmission of digitized video signals can attain video images of a much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data therethrough, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse coded modulation), two-dimensional DCT(discrete cosine transform), quantization of DCT coefficients, and VLC(variable length coding). The motion compensated DPCM is a process of estimating the movement of an object between a current frame and its previous frame, and predicting the current frame according to the motion flow of the object to produce a differential signal representing the difference between the current frame and its prediction. This method is described, for example, in Staffan Ericsson, "Fixed and Adaptive Predictors for Hybrid Predictive/Transform Coding", *IEEE Transactions on Communications*, COM-33, No. 12(Dec. 1985); and in Ninomiya and Ohtsuka, "A Motion-Compensated Interframe Coding Scheme for Television Pictures", *IEEE Transactions on Communications*, COM-30, No. 1 (January 1982).

The two-dimensional DCT, which reduces or makes use of spatial redundancies between image data, converts a block of digital image data, for example, a block of 8×8 pixels, into a set of transform coefficient data. This technique is described in Chen and Pratt, "Scene Adaptive Coder", *IEEE Transactions on Communications*, COM-32, No. 3(March 1984). By processing such transform coefficient data with a quantizer, zigzag scanning, and VLC, the amount of data to be transmitted can be effectively compressed.

Specifically, in the motion compensated DPCM, current frame data is predicted from the corresponding previous frame data based on an estimation of the motion between the current and the previous frames. Such estimated motion may be described in terms of two dimensional motion vectors representing the displacement of pixels between the previous and the current frames.

There have been two basic approaches to estimate the displacement of pixels of an object: one is a block-by-block estimation and the other is a pixel-by-pixel approach.

In the block-by-block motion estimation, a block in a current frame is compared with blocks in its previous frame until a best match is determined. From this, an interframe displacement vector (how much the block of pixels has moved between frames) for the whole block can be estimated for the current frame being transmitted. However, in the block-by-block motion estimation, blocking effects at the boundary of a block may occur in a motion compensation process; and poor estimates may result if all pixels in the block do not move in a same way, to thereby decrease the overall picture quality.

Using a pixel-by-pixel approach, on the other hand, a displacement is determined for each and every pixel. This technique allows a more exact estimation of the pixel value and has the ability to easily handle scale changes (e.g., zooming, movement perpendicular to the image plane). However, in the pixel-by-pixel approach, since a motion vector is determined at each and every pixel, it is virtually impossible to transmit all of the motion vectors to a receiver.

SUMMARY OF THE INVENTION

It is, therefore, a primary object of the invention to provide an improved motion estimation and compensation technique on a pixel-by-pixel basis using feature points and supplementary quasi-feature points in accordance with the present invention.

In accordance with the invention, there is provided an apparatus, for use in a motion-compensated video signal encoder, for determining a predicted current frame based on a current frame and a previous frame of a digital video signal, comprising: means for selecting a number of pixels (feature points) from the pixels contained in the previous frame; means for detecting a first set of motion vectors between the current and the previous frames, each of the first set of motion vectors representing a motion for each of the selected pixels; means for producing a second set of motion vectors for all of the pixels contained in the current frame by using said first set of motion vectors; means for assigning the value of each of the pixels in the previous frame, which corresponds to one of the pixels in the current frame through one of the second set of motion vectors, as the value of said one of the pixels in the current frame, to thereby determine a preliminary predicted current frame; means for finding the difference between the current frame and the preliminary predicted current frame to determine collective error regions; means for selecting one pixel(supplementary quasi-feature point) from the pixels contained in each of the collective error regions; means for determining a third set of motion vectors for the selected pixels from the collective error regions; means for producing a fourth set of motion vectors for all of the pixels contained in the current frame by using said first set of motion vectors and said third set of motion vectors; and means for assigning the value of each of the pixels in the previous frame, which corresponds to one of the pixels in the current frame through one of the fourth set of motion vectors, as the value of said one of the pixels in the current frame, to thereby determine the predicted current frame.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
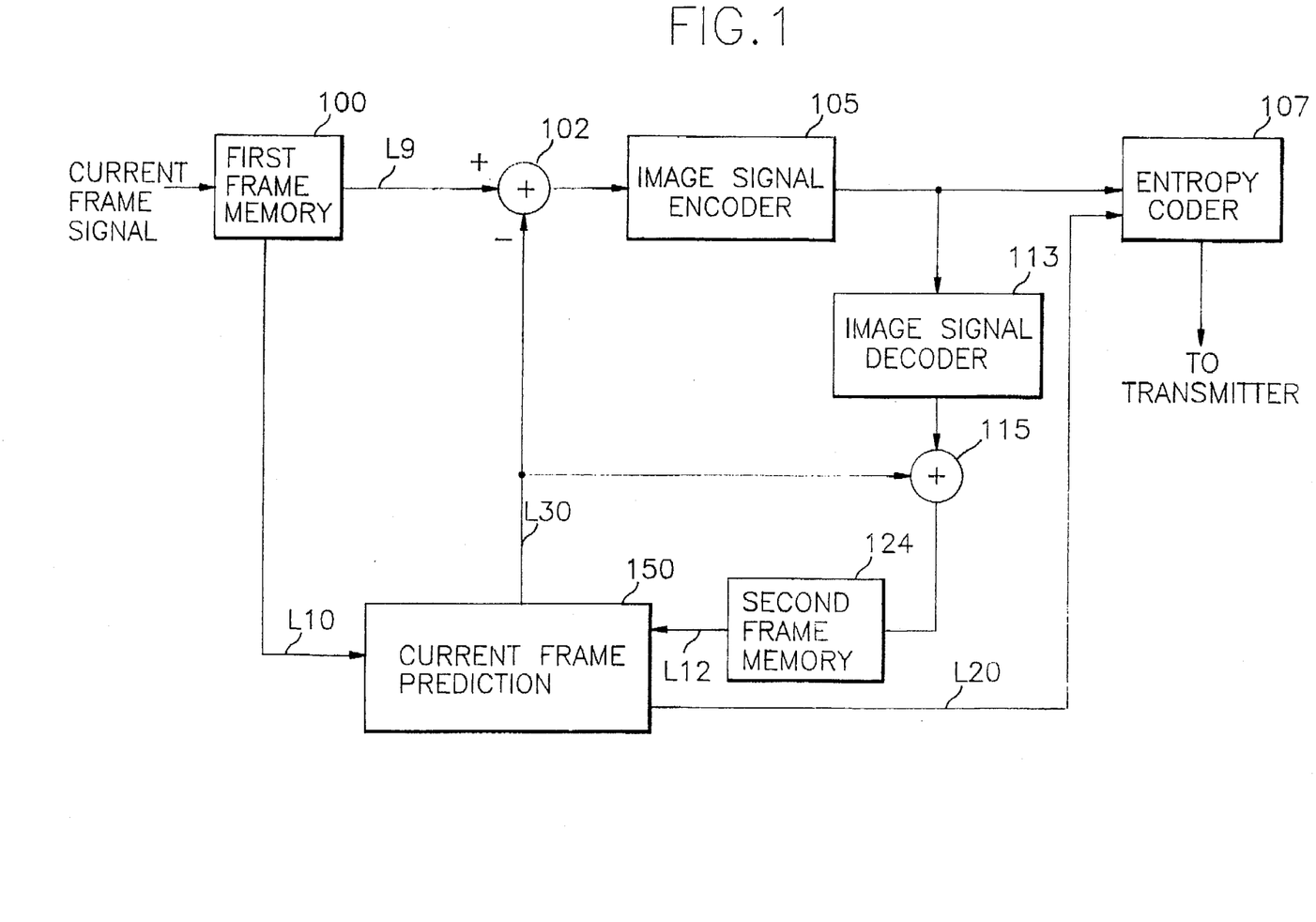
FIG. 1 is an image signal encoding apparatus having a current frame prediction block in accordance with the present invention.

FIG. 1 describes a preferred embodiment of an image signal encoding apparatus having a current frame prediction block of the present invention. As shown in FIG. 1, a current frame signal is stored in a first frame memory 100 which is connected to a subtractor 102 through a line L9 and to a current frame prediction block 150 through a line L10.

In the current frame prediction block 150, a current frame signal on the line L10 retrieved from the first frame memory 100 and a reconstructed previous frame signal on a line L12 from a second frame memory 124 are processed to predict the current frame on a pixel-by-pixel basis to generate a predicted current frame signal onto a line L30 and a set of motion vectors for feature points onto a line L20. Details of the current frame prediction block 150 will be described with reference to FIG. 2.

The predicted current frame signal on the line L30 is subtracted from a current frame signal on the line L9 at the subtractor 102, and the resultant data, i.e., an error signal denoting the differential pixel value, is dispatched to an image signal encoder 105, wherein the error signal is encoded into a set of quantized transform coefficients, e.g., by using a DCT and any of the known quantization methods. Thereafter, the quantized transform coefficients are transmitted to an entropy coder 107 and an image signal decoder 113. At the entropy coder 107, the quantized transform coefficients from the image signal encoder 105 and the motion vectors transmitted through the line L20 from the current frame prediction block 150 are coded together by using, e.g., a variable length coding technique; and transmitted to a transmitter(not shown) for the transmission thereof.

On the other hand, the image signal decoder 113 converts the quantized transform coefficients from the image signal decoder 105 back to a reconstructed error signal by employing an inverse quantization and an inverse discrete cosine transform.

The reconstructed error signal from the image signal decoder 113 and the predicted current frame signal on the line L30 from the current frame prediction block 150 are combined at an adder 115 to thereby provide a reconstructed current frame signal to be stored as the previous frame in the second frame memory 124.

Figure 2:
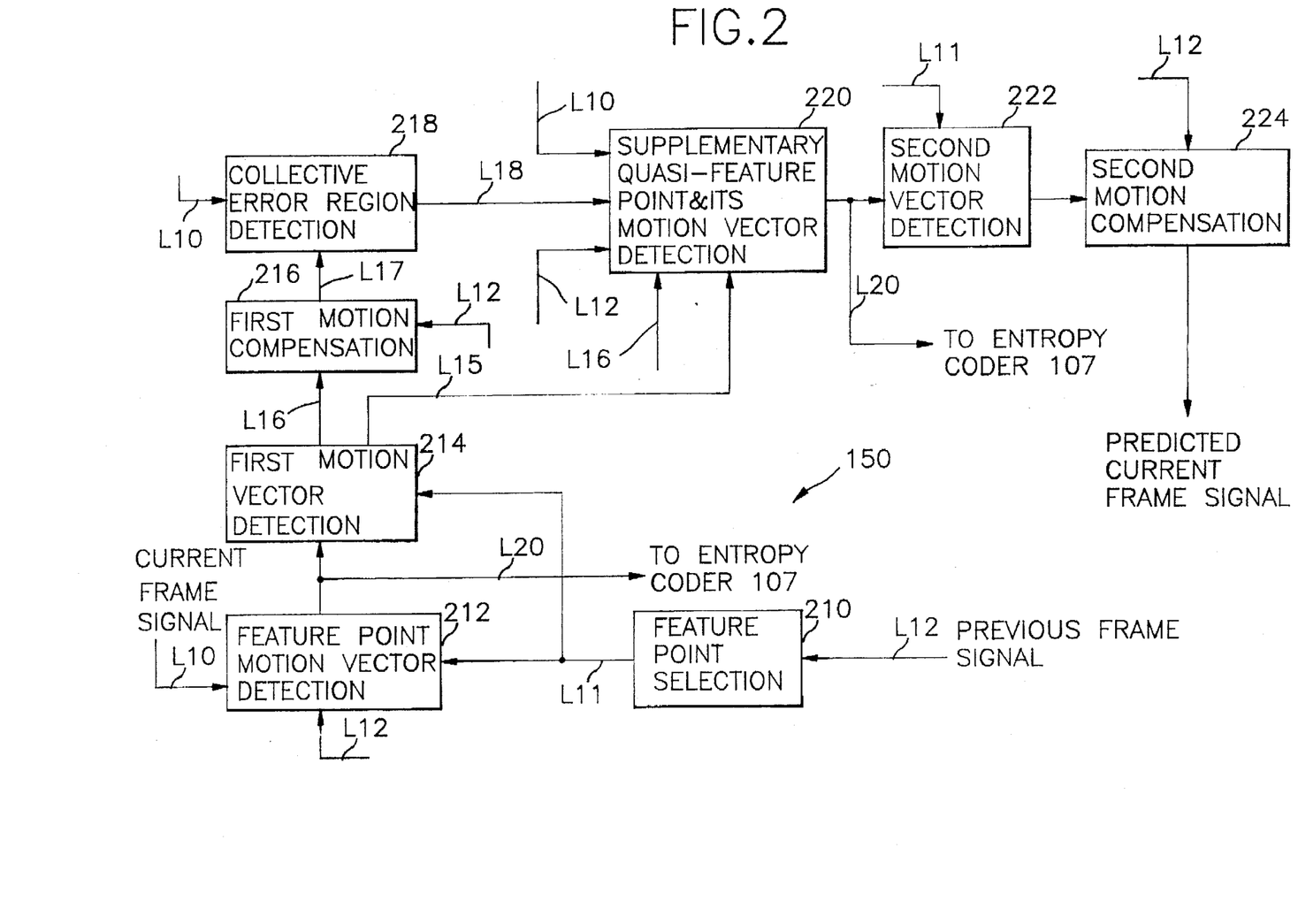
FIG. 2 shows a detailed block diagram of the current frame prediction block of FIG. 1.

Referring to FIG. 2, there are illustrated details of the current frame prediction block 150 shown in FIG. 1. As shown in FIG. 2, a previous frame signal on the line L12 from the second frame memory 124 is inputted to a feature point selection block 210, a feature point motion vector detection block 212, a first motion compensation block 216, a supplementary quasi-feature point and its motion vector detection block 220 and a second motion compensation block 224.

Figure 5:
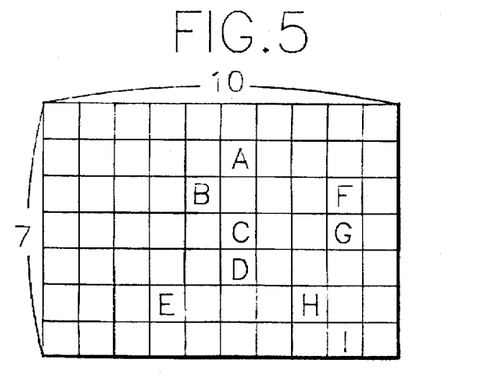
FIG. 5 describes an exemplary frame for defining feature points.

At the feature point selection block 210, a number of feature points are selected from the pixels contained in the previous frame. Each of the feature points is defined as a position of a pixel, representing the motion of an object in the frame. Referring to FIG. 5, there is shown an exemplary frame of 10×7 pixels. If a moving object exists around the center of the frame and the motion of the moving object is successfully represented by a set of pixels "A" to "I", these pixels are selected as the feature points of the frame.

Figure 6A:
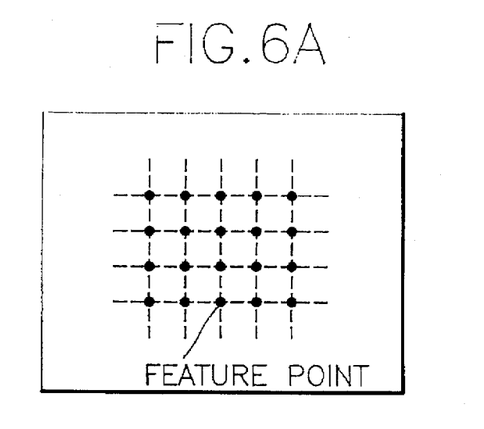
FIGS. 6A and 6B illustrate two types of grids used to select feature points.
Figure 6B:
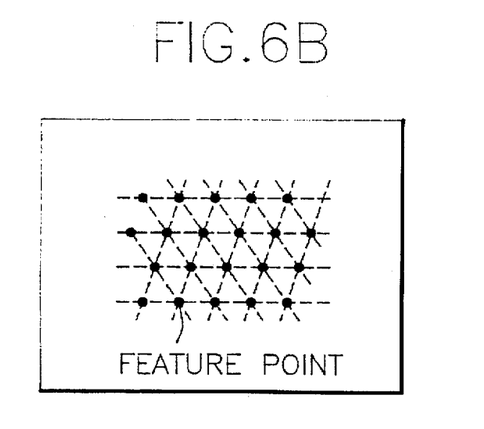

In a preferred embodiment of the present invention, the feature points are determined by a grid technique employing various types of grids, e.g., rectangular grids or hexagonal grids shown in FIGS. 6A and 6B, respectively. As shown in FIGS. 6A and 6B, feature points are located at the nodes of the grids.

Figure 7A:
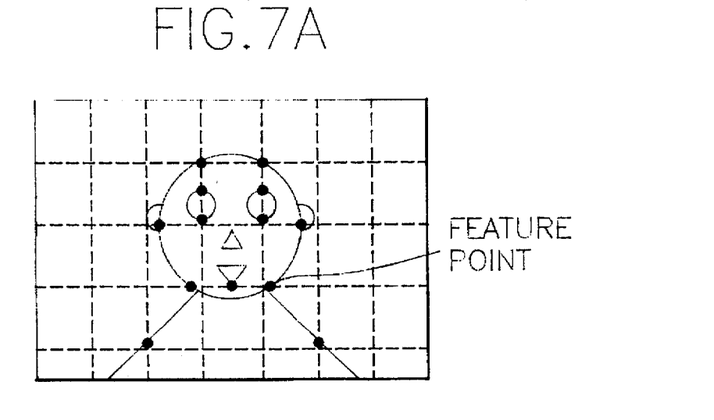
FIGS. 7A and 7B provide the technique of selecting feature points through the use of grids and edges.
Figure 7B:
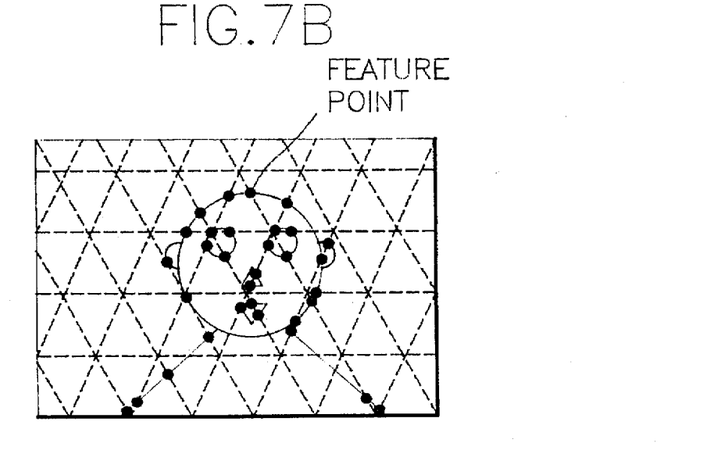

In another preferred embodiment of the invention, an edge detection technique is employed together with the above described grid technique as shown in FIGS. 7A and 7B. In this technique, intersection points of the grids and the edge of the moving object are selected as the feature points.

Referring back to FIG. 2, the selected feature points from the feature point selection block 210 are inputted to a feature point motion vector detection block 212, a first motion vector detection block 214 and a second motion vector detection block 222. And the current frame signal on the line L10 is provided to the feature point motion vector detection block 212.

In the feature point motion vector detection block 212, a first set of motion vectors for the selected feature points is detected. Each of the motion vectors of the first set represents a spatial displacement between a feature point in the previous frame and a most similar pixel thereto in the current frame.

There are many processing algorithms which may be used in detecting the motion vectors on a pixel-by-pixel basis. In the preferred embodiments of the invention, there is used a block matching algorithm: when a feature point is received from the feature point selection block 210, a feature point block having the feature point at the center thereof, e.g., 5×5 pixels of the previous frame, is retrieved via the line L12 from the second frame memory 124(shown in FIG. 1). Thereafter, a feature point motion vector for the feature point block is determined after a similarity calculation between the feature point block and each of a plurality of equal-sized candidate blocks included in a generally larger search region, e.g., 10×10 pixels, of the current frame retrieved from the first frame memory 100(shown in FIG. 1).

After detecting the motion vectors for all of the feature points, the first set of motion vectors is provided to the first motion vector detection block 214 and the entropy coder 107(shown in FIG. 1) via the line L20. In the first motion vector detection block 214, a second set of motion vectors for all of the pixels contained in the current frame is determined through the use of the first set of motion vectors and the feature point information from the feature point selection block 210.

In order to determine the second set of motion vectors, a set of motion vectors for "quasi-feature points", which represent those pixel points of the current frame shifted from the feature points of the previous frame by the first set of motion vectors, are determined. The magnitude of a motion vector for a quasi-feature point is identical to the motion vector for its corresponding feature point; but the direction between the two motion vectors is opposite. After determining the motion vectors for all of the quasi-feature points, the motion vectors for the remaining pixel points, i.e., non-quasi-feature points in the current frame, are determined as follows.

Figure 8:
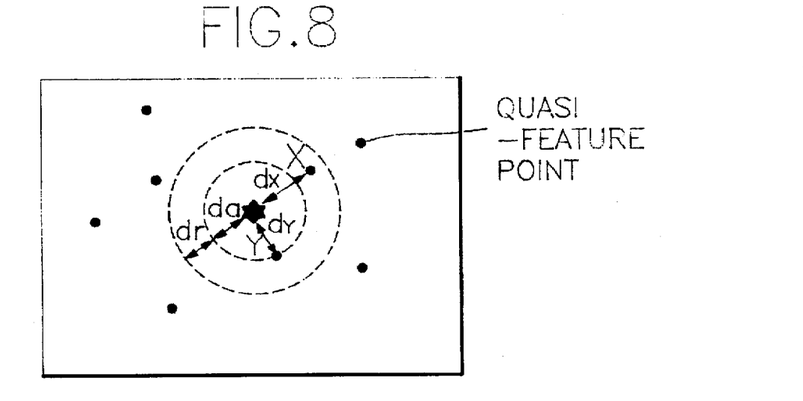
FIG. 8 depicts a method of detecting a motion vector for a non-quasi-feature point.

As shown in FIG. 8, a number of quasi-feature points are irregularly distributed in the entire current frame. A motion vector for a star marked non-quasi-feature point is determined by averaging the quasi-feature points which are placed within a circle boundary having a radius of "dr+da", wherein "da" is the distance to a nearest quasi-feature point from the star marked pixel position, and "dr" is a predetermined expanding radius for including other feature points to be used in the motion vector calculation. For example, if the nearest feature point is "Y" and the feature point "X" is located within the boundary of "da+dr", the motion vector $(MV_x, MV_y)$ for the star marked pixel is calculated as:

$$(MV_x, MV_y) = \frac{\frac{1}{d_x}(MV_x, MV_y)_x + \frac{1}{d_y}(MV_x, MV_y)_y}{\frac{1}{d_x} + \frac{1}{d_y}}$$

wherein $d_X$ and $d_Y$ are the distances of quasi-feature points M and Y from the star marked pixel position, respectively; and $(MV_x, MV_y)_X$ and $(MV_x, MV_y)_Y$ are the respective motion vectors for the quasi-feature points.

Referring back to FIG. 2, the second set of motion vectors for the quasi-feature points and the non-quasi feature points are provided to the first motion compensation block 216 via a line L16. In the meantime, the part of the second set of motion vectors for the quasi-feature points is provided to the supplementary quasi-feature point and its motion vector detection block 220 through a line L15.

The first motion compensation block 216 assigns the value of each of the pixels in the previous frame stored in the second frame memory 124(shown in FIG. 1), which corresponds to one of the pixels in the current frame through one of the second set of motion vectors, as the value of said one of the pixels in the current frame, to thereby produce a preliminary predicted current frame. The output of the motion compensation block 216 is provided to a collective error region detection block 218 and the supplementary quasi-feature point and its motion vector detection block 220.

Figure 3:
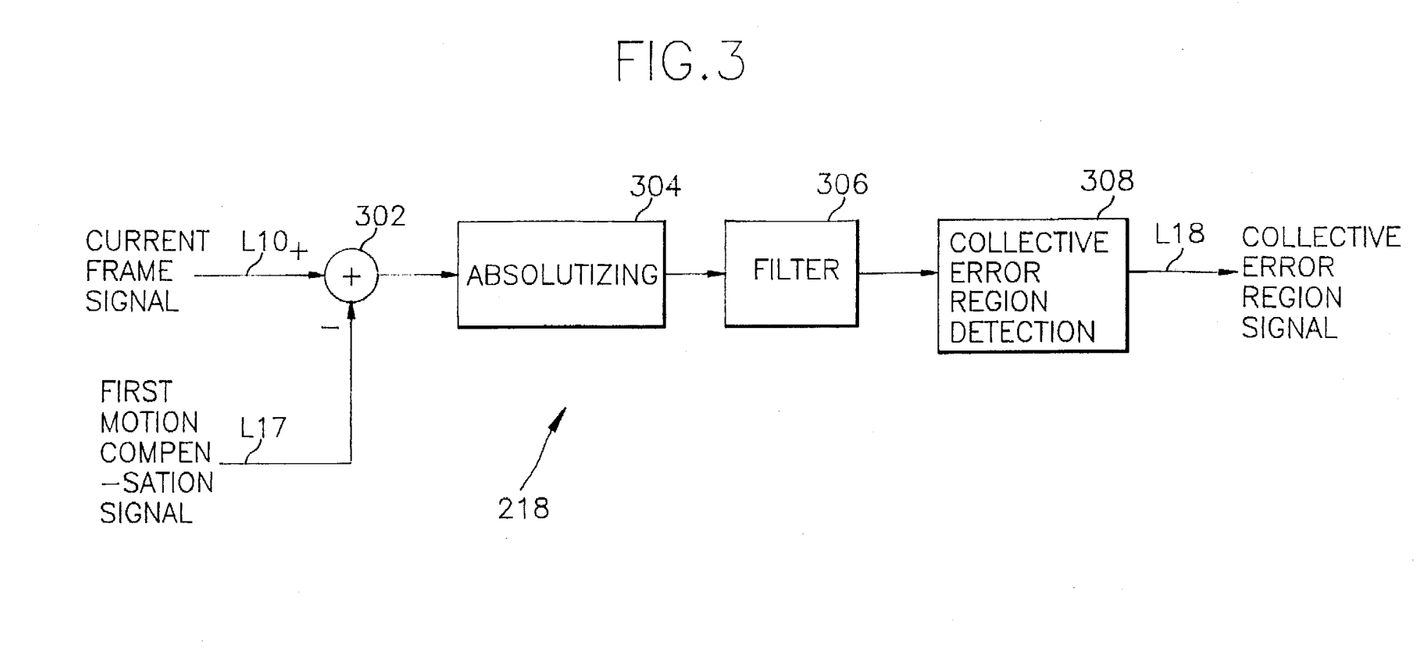
FIG. 3 exhibits an exemplary block diagram of the collective error region detection block of FIG. 2.
Figure 9A:
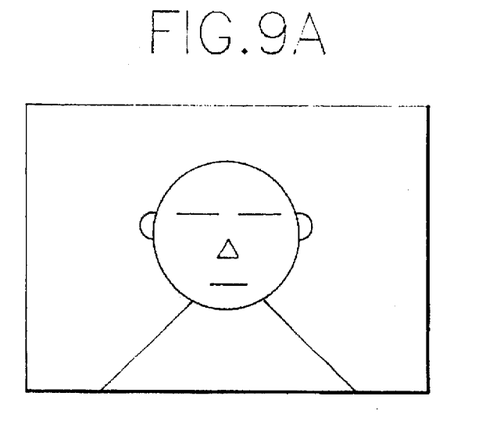
FIGS. 9A to 9E demonstrate the technique of detecting a collective error region.
Figure 9B:
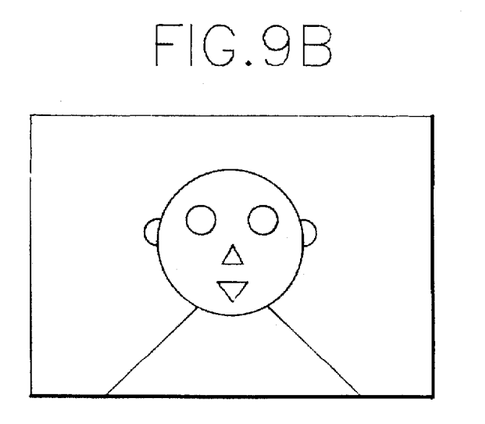

FIG. 3 illustrates details of the collective error region detection block 150 shown in FIG. 2. As shown in FIG. 3, a current frame is provided through the line L10 from the first frame memory 100 and the preliminary predicted current frame signal through the line L17 from the first motion compensation block 216 are inputted to a subtractor 302 which is connected to an absolutizing block 304. If the current frame signal is as shown in FIG. 9A and the preliminary predicted current frame is as shown in FIG. 9B, an output from the subtractor 302 and the absolutizing block 304 may be represented as the one shown in FIG. 9C.

Figure 9C:
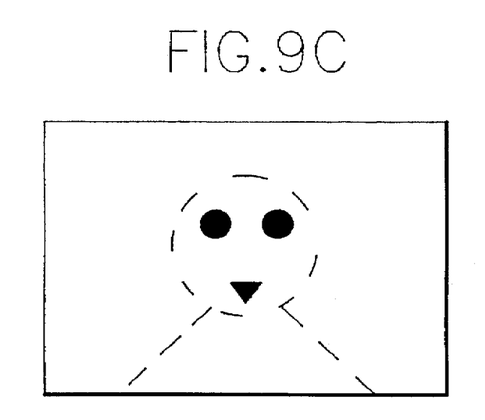
Figure 9D:
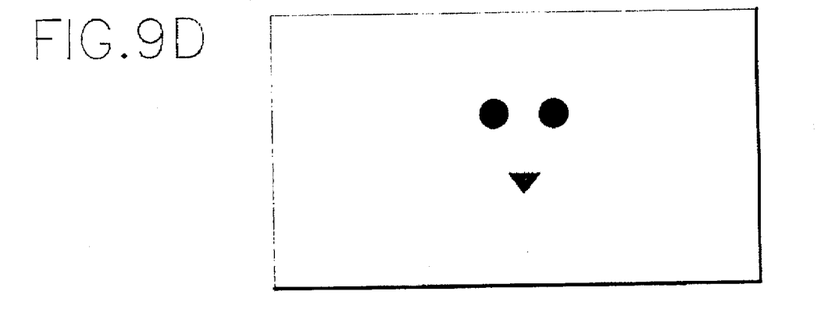
Figure 9E:
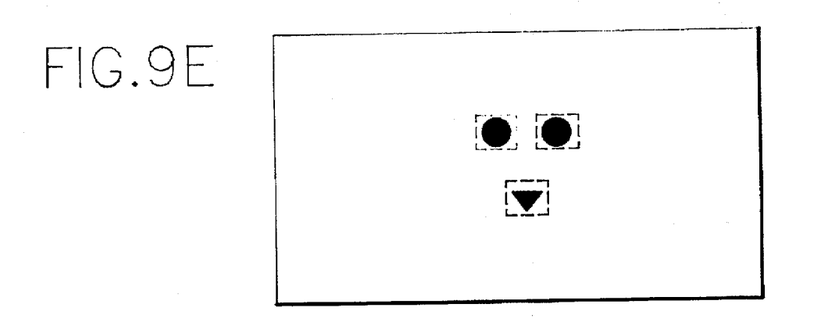

As shown in FIG. 9C, a number of error potions may be found around, e.g., the eyes and mouth and edge of the moving object. The absolute error signal from the absolutizing block 304 is provided to a filter 306, wherein the absolute error signal is filtered so that tiny error regions are eliminated as shown in 9D. Thereafter, the filtered error signal is supplied to the collective error region detection block 308 wherein the collective error region is partitioned by using rectangular windows as shown in FIG. 9E to provide a collective error region signal onto a line L18.

Figure 4A:
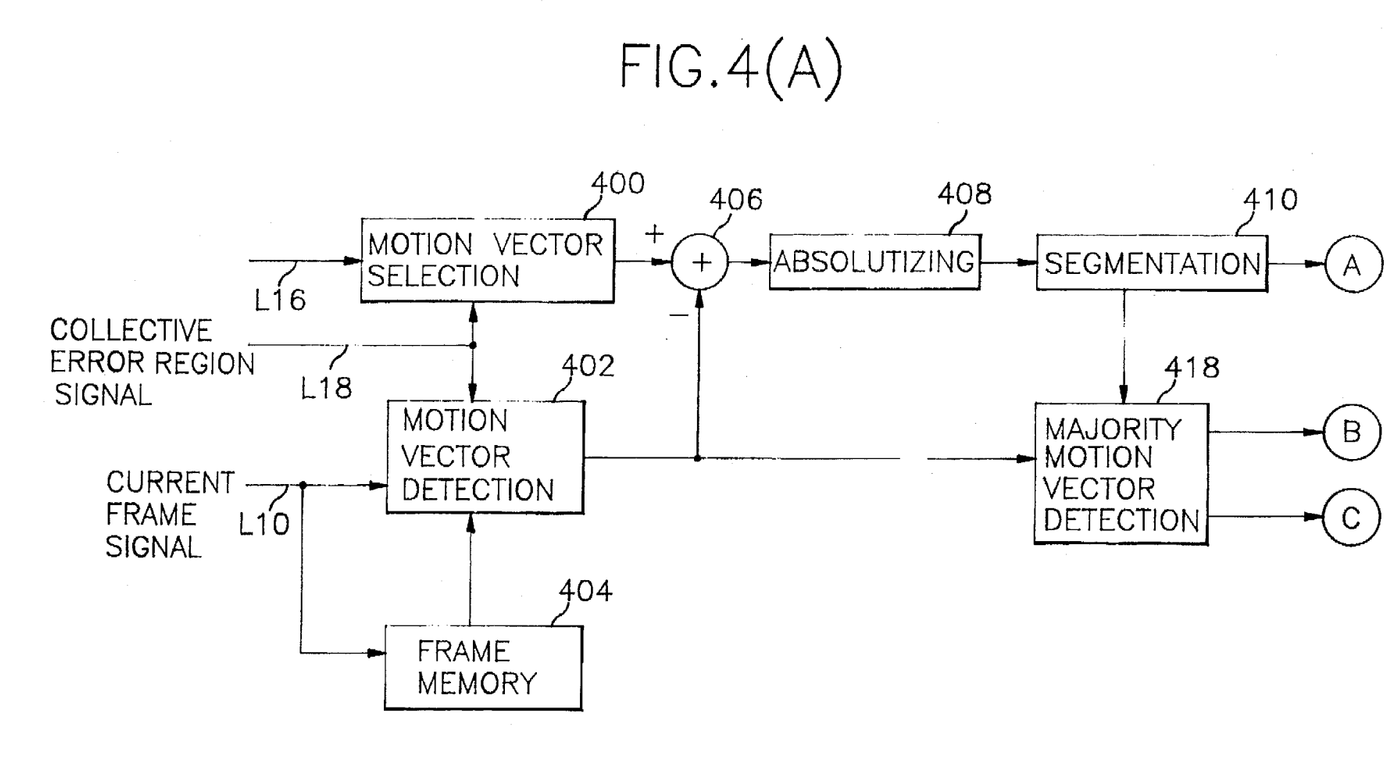
FIGS. 4A and 4B offer a detailed block diagram of the supplementary quasi-feature point and its motion vector detection block of FIG. 2.
Figure 4B:
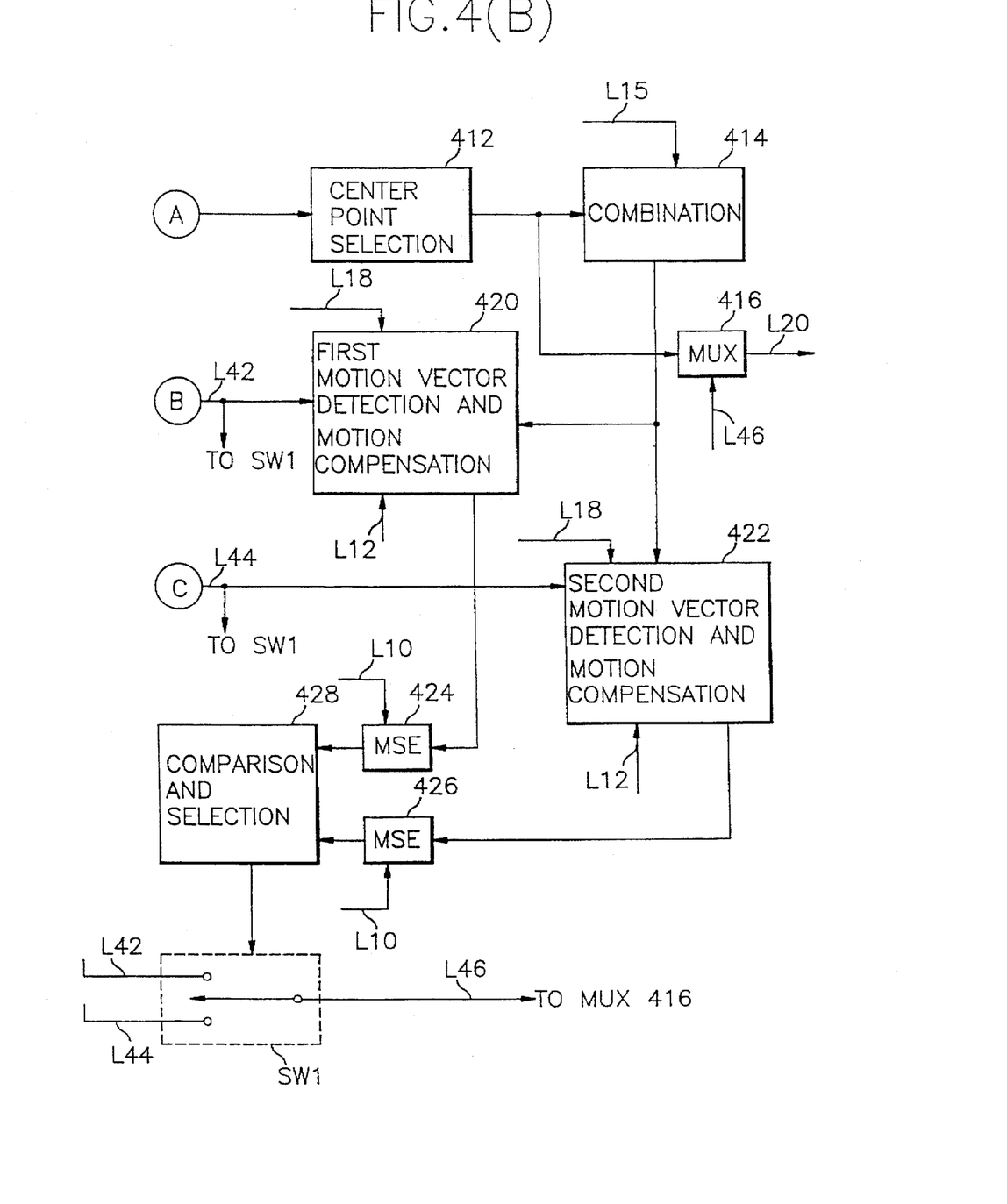

Referring back to FIG. 2, the collective error region signal on the line L18 is provided to the supplementary quasi-feature point and its motion vector detection block 220, wherein one pixel is selected among the pixels in each of the collective error regions and a motion vector for the selected pixel is determined as the quasi-feature point and its motion vector. FIG. 4A and 4B depict details of the supplementary quasi-feature point and its motion vector detection block 220 shown in FIG. 2.

As shown in FIGS. 4A and 4B, a collective error region signal is provided to a motion vector selection block 400 and a motion vector detection block 402 to notify a collective error region thereto. In the motion vector selection block 400, in response to the collective error region signal, a first group of motion vectors for the pixels in the collective error region is selected from the second set of motion vectors provided from the first motion vector detection block 214 (shown in FIG. 2). And the first group of motion vectors is provided to a subtractor 406.

In the meantime, in the motion vector detection block 402, a second group of motion vectors for the pixels in the collective error region is determined between the current frame and its previous frame stored in the frame memory 404. And the second group of motion vectors is also provided to the subtractor 466.

Figure 10A:
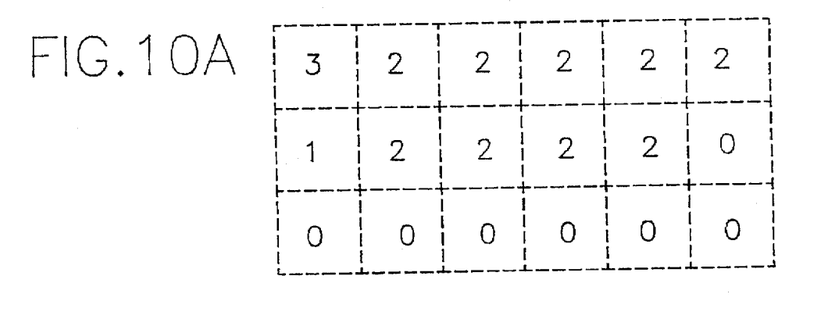
FIGS. 10A and 10B explain the technique of detecting a supplementary quasi-feature point and its motion vector.
Figure 10B:
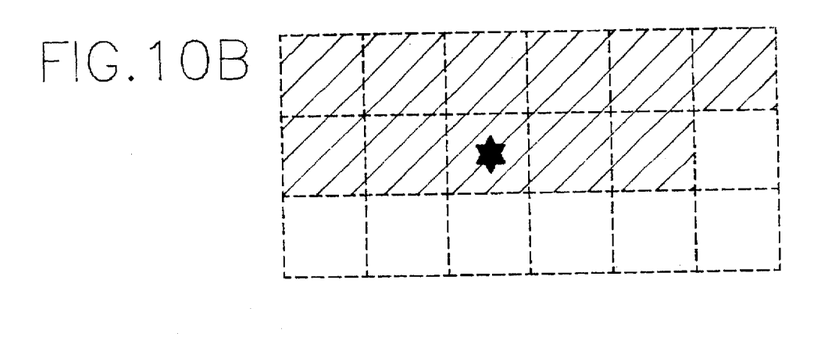

Thereafter, in the subtractor 406, the difference between the two groups of motion vectors is calculated., And the magnitude of the difference of each of the pixels is calculated at an absolutizing block 408. And then, the output of the absolutizing block 408 is segmented according to the magnitude of the difference between the two groups of motion vectors. If the magnitude of the difference is as shown in FIG. 10A, the collective error region is divided into two subregions at the segmentation block 410 as shown in FIG. 10B. In this situation depicted by FIG. 10B, a star marked pixel becomes a quasi-feature point of this collective error region, and its motion vector is selected as follows. First, a majority motion vector detection block 418 detects a subregion motion vector for each of the two subregions by selecting a majority motion vector for each of the subregions, to send a first subregion motion vector to a first motion vector detection and motion compensation block 420 and a switch SW1 through a line L42; and to send a second subregion motion vector to a second motion vector detection and motion compensation block 422 and the switch SW1 through a line L44. In the meantime, a selected center point of the collective error region from the center point selection block 412 is combined with the quasi-feature points provided through the line L15 from the first motion vector detection block 214, and the resultant data is provided to the first and the second motion vector detection and motion compensation blocks 420 and 422.

The first motion vector detection and motion compensation block 420 detects motion vectors for all of the pixels in the collective error region by averaging at least one of the combined motion vectors between the set of motion vectors for the quasi-feature points and the first subregion motion vector; and retrieves the value of each of the pixels contained in the collective error region from the second frame memory 124, to thereby determine a first predicted region which is supplied to a first mean square error detection block 424.

The second motion vector detection and motion compensation block 420 detects motion vectors for all of the pixels in the collective error region by averaging at least one of the combined motion vectors between the set of motion vectors for the quasi-feature points and the second subregion motion vector; and retrieves the value of each of the pixels in the collective error region from the second frame memory 124, to thereby determine a second predicted region which is supplied to a second mean square error detection block 426.

In the first mean square error detection block 424, the difference between the current frame and the first predicted region is determined, and the result is provided to a comparison and selection block 428. In this manner, in the second mean square error detection blocks 426, the difference between the current frame and the second predicted region is determined, and the result is supplied to the comparison and selection block 428.

In the comparison and selection block 428, it is determined which of the outputs from the two mean square error detection blocks 424 and 426 is smaller than the other, and a switch control signal is provided to the switch SW1, wherein one of the two inputs on the lines L42 and L44 is selected and provided to a multiplexer 416. In the multiplexer 416, a center point from the center point selection block 412 and its motion vector provided from the switch SW1 are combined; and the result as a supplementary quasi-feature point and its motion vector are provided to the entropy coder 107.

Referring back to FIG. 2, in the second motion vector detection block 222, a third set of motion vectors for all of the pixels contained in the current frame is determined through the use of the quasi-feature points and the supplementary quasi-feature points. And the third set of motion vectors is provided to the second motion compensation block 224. The second motion compensation block 224 assigns the value of each of the pixels in the previous frame stored in the second frame memory 124(shown in FIG. 1), which corresponds to one of the pixels in the current frame through one of the third set of motion vectors, as the value of said one of the pixels in the current frame, to produce a final predicted current frame.

The motion prediction block in a decoder corresponding to the encoder of the present invention will have the same elements as shown in FIG. 2, excepting the feature point motion vector detection block 212, the first motion vector detection block 214, the first motion compensation block 216, the collective error detection block 218 and the supplementary quasi-feature point and its motion vector detection block 220. This is because the feature point motion vectors, the supplementary quasi-feature points and their motion vectors transmitted from the encoder are provided thereto. Therefore, the motion prediction block will have a feature point selection block, a second current frame motion vector detection block and a second motion compensation block whose functions are the same as those explained with respect to the encoder.

Further, a previous frame signal from a frame memory in the decoder is inputted to the feature point selection block to select a number of feature points. The second current frame motion vector detection block determines the motion vectors for all of the pixels to be contained in the predicted current frame, in response to the selected feature points, the supplementary quasi-feature points and their motion vectors transmitted from the encoder explained with reference to FIG. 2. The second motion compensation block provides the predicted current frame which is the same as that of the encoder. The predicted current frame is further processed at the decoder to recover the current frame which is essentially identical to the original video signal.

While the present invention has been shown and described with reference to the particular embodiments, it will be apparent to those skilled in the art that many changes and modifications may be made without departing from the spirit and scope of the invention as defined in the appended claims.

What is claimed is:

1. An apparatus, for use in a motion-compensated video signal encoder, for determining a predicted current frame based on a current frame and a previous frame of a digital video signal, comprising:

means for selecting a number of pixels from the pixels contained in the previous frame;

means for detecting a first set of motion vectors between the current and the previous frames, each of the first set of motion vectors representing a motion for each of the selected pixels;

means for producing a second set of motion vectors for all of the pixels contained in the current frame by using said first set of motion vectors and by determining a set of motion vectors for quasi-feature points and non-quasi-feature points;

means for assigning the value of each of the pixels in the previous frame, which corresponds to one of the pixels in the current frame through one of the second set of motion vectors, as the value of said one of the pixels in the current frame, to thereby determine a preliminary predicted current frame;

means for finding the difference between the current frame and the preliminary predicted current frame to detect collective error regions;

means for selecting one pixel from the pixels contained in each of the collective error regions;

means for detecting a third set of motion vectors for the selected pixels from the collective error regions; means for producing supplementary quasi-feature points through the use of the means for selecting one pixel;

means for producing a fourth set of motion vectors for all of the pixels contained in the current frame through the use of the quasi-feature points and the supplementary quasi-feature points; and means for assigning the value of each of the pixels in the previous frame, which corresponds to said one of the pixels in the current frame through one of the fourth set of motion vectors, as the value of said one of the pixels in the current frame, to thereby determine the predicted current frame.

2. The apparatus in accordance with claim 1, wherein said means for finding the difference includes:

means for subtracting the preliminary predicted current frame from the current frame to produce an error region signal;

means for absolutizing the error region signal;

means for filtering the absolute error region signal; and means for windowing the filtered absolute error region signal to produce a collective error region signal.

3. The apparatus in accordance with claim 1, wherein said means for detecting the third set of motion vectors includes:

means for dividing each collective error region into at least two subregions according to the magnitude of the error value of each of the pixels therein; and means for detecting a subregion motion vector for each of the subregions by selecting a majority motion vector for each of the subregions, to provide the third set of motion vectors.

4. A method, for use in a motion-compensated video signal encoder, for determining a predicted current frame based on a current frame and a previous frame of a digital video signal, comprising the steps of:

(a) selecting a number of pixels from the pixels contained in the previous frame;

(b) detecting a first set of motion vectors between the current and the previous frames, each of the first set of motion vectors representing a motion for each of the selected pixels;

(c) producing a second set of motion vectors for all of the pixels contained in the current frame by using said first set of motion vectors and by determining a set of motion vectors for quasi-feature points and non-quasi-feature points;

(d) assigning the value of each of the pixels in the previous frame, which corresponds to one of the pixels in the current frame through one of the second set of motion vectors, as the value of said one of the pixels in the current frame, to determine a preliminary predicted current frame;

(e) finding the difference between the current frame and the preliminary predicted current frame to detect collective error regions;

(f) selecting one pixel from the pixels contained in each of the collective error regions;

(g) detecting a third set of motion vectors for the selected pixels from the collective error regions;

(h) producing supplementary quasi-feature points through the use of the step (f) of selecting;

(i) producing a fourth set of motion vectors for all of the pixels contained in the current frame through the use of the quasi-feature points and the supplementary quasi-feature points; and (j) assigning the value of each of the pixels in the previous frame, which corresponds to said one of the pixels in the current frame through one of the fourth set of motion vectors, as the value of said one of the pixels in the current frame, to thereby determine the predicted current frame.

5. The method in accordance with claim 4, wherein said step(e) includes the steps of:

(e1) subtracting the preliminary predicted current frame from the current frame to produce an error region signal;

(e2) absolutizing the error region signal;

(e3) filtering the absolute error region signal; and (e4) windowing the filtered absolute error region signal to produce a collective error region signal.

6. The method in accordance with claim 4, wherein said step(g) includes the steps of:

(g1) dividing each of the collective error regions into at least two subregions according to the magnitude of the error value of each of the pixels therein; and (g2) detecting a subregion motion vector for each of the subregions by selecting a majority motion vector for each of the subregions.

* * * * *